United States Patent [19]

Oliphant

[11] Patent Number: 4,646,711
[45] Date of Patent: Mar. 3, 1987

[54] PORTABLE COOKING GRILL

[76] Inventor: Adam L. Oliphant, 1452 D St., NE., Washington, D.C. 20002

[21] Appl. No.: 824,390

[22] Filed: Jan. 23, 1986

[51] Int. Cl.⁴ .............................................. F24C 1/16
[52] U.S. Cl. .................... 126/9 R; 126/25 R
[58] Field of Search ............................ 126/25 R, 9 R

[56] References Cited

U.S. PATENT DOCUMENTS

| | | | |
|---|---|---|---|
| 2,379,239 | 6/1945 | Krebs | 126/25 |
| 2,791,959 | 5/1957 | Pirz | 99/421 |
| 2,838,991 | 6/1958 | Kleinmann et al. | 99/421 |
| 2,959,165 | 11/1960 | Mark | 126/9 |
| 3,380,444 | 4/1968 | Stalker | 126/9 R |
| 3,503,324 | 3/1970 | Gmeiner | 99/393 |
| 3,688,757 | 9/1972 | Dusek | 126/9 R |
| 3,976,046 | 8/1976 | Morton et al. | 126/9 |
| 4,453,529 | 6/1984 | Spencer et al. | 125/9 |
| 4,457,290 | 7/1984 | Edwards | 126/9 |
| 4,492,215 | 1/1985 | DiGianvittorio | 126/9 |
| 4,508,096 | 4/1985 | Slattery | 126/9 |
| 4,526,158 | 7/1985 | Lee | 126/9 |
| 4,541,406 | 9/1985 | DaSambiagio | 126/9 |
| 4,548,192 | 10/1985 | Hsu | 126/25 |
| 4,569,327 | 2/1986 | Velten | 126/9 R |

*Primary Examiner*—Carroll B. Dority, Jr.
*Attorney, Agent, or Firm*—David H. Semmes; Warren E. Olsen

[57] ABSTRACT

A portable cooking grill of the type used for outdoor barbecue cooking, hiker's campfire cooking and the like. The grill consists of a pair of upstanding end supports, left and right upright end plates secured to the end supports to define a cooking enclosure, a back plate fitted within the end plates, a top cover hinged to the back plate and a cooling grill and fire grate complementally fitted within the opposed end plate and back plate. An optional ash pan and fire box door may be mounted beneath the fire grate. The entire assembly may be broken down and nested together for carrying either by pivoted handle or within a backpack or the like.

13 Claims, 5 Drawing Figures

PORTABLE COOKING GRILL

BACKGROUND OF THE INVENTION

1. Field of the Invention

Portable cooking grills, particularly grills which may be disassembled and nested together for backpacking or hand carrying.

2. Description of the Prior Art

The invention is characterized by its portability in a hiker's back-pack or the like, as well as its capability of serving both as a cooking grill and oven.

The prior art references suggest portability achieved by nesting elements together and the employment of an adjustable cooking grill. However, the prior art does not show the combination of elements which affords duel use as cooking grill and oven, portability, yet extraordinary stability when the individual elements are assembled.

SUMMARY OF THE INVENTION

The portable cooking grill includes a pair of H-shaped end supports to which are fixed opposed end plates and a back plate, defining a cooking area, with a top hinged to the back plate so that it may serve either as a cover for the cooking area or as an extended shelf.

A cooking grill and ash pan are fitted complementally within the cooking area defined by the opposed end plates and back plate, such that their horizontal rods extend through the end plates and end supports as a rigidizing support. A fire grate may be fitted also within the opposed end plates intermediate the cooking grill and the ash pan and a fire box door may be pivoted to one of the end plates, so as to enclose a fire box area beneath the fire grate. The entire assembly may include a pair of wheels fitted to one of the H-shaped end supports and a handle may be pivoted to the other of the H-shaped end supports, so that the assembly may be wheeled about.

DESCRIPTION OF THE PREFERRED EMBODIMENTS

Figure 1:
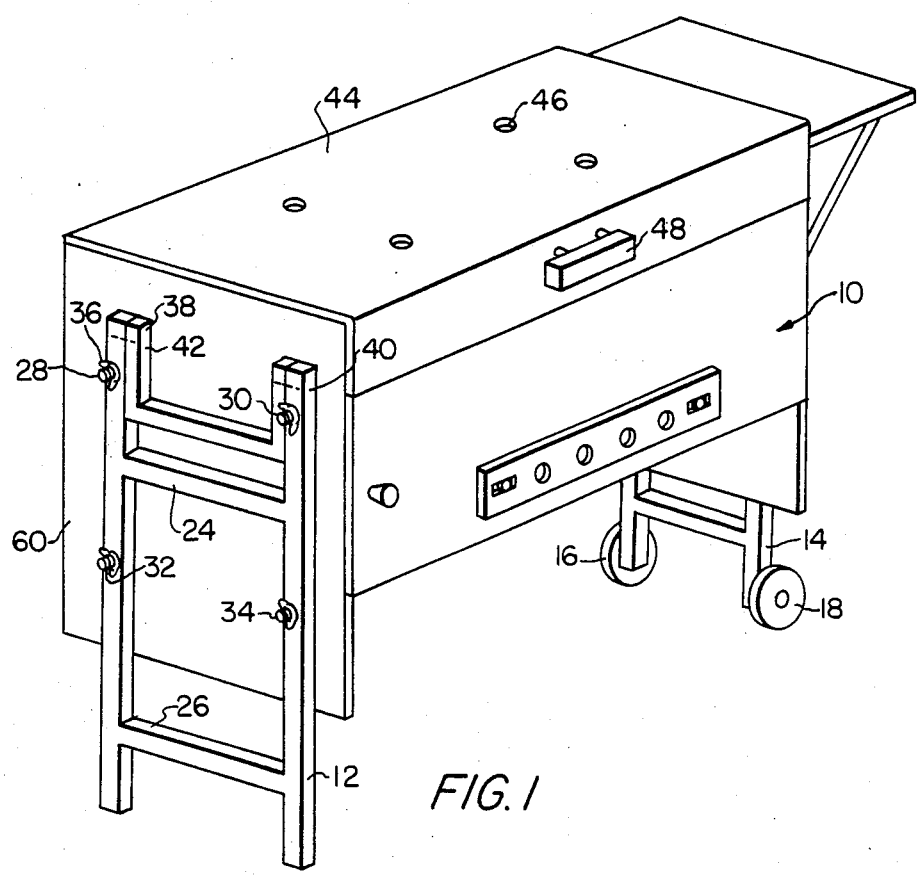
FIG. 1 is a perspective of the assembled cooking grill.

In FIG. 1, portable cooking grill 10 is shown in its assembled state as including opposed H-shaped end supports 12, 14, left hand end plate 60 and right hand end plate 62 secured respectively thereto. Wheels 16, 18 may be secured conventionally to end support 14 and handle 38 may be pivoted to end support 12 by means of pin 42 or the like.

Opposed end supports 12 and 14 may include horizontal rigidizing members 24, 26. Hinged top 44 may include vent holes 46 and carrying handle 48.

Figure 2:
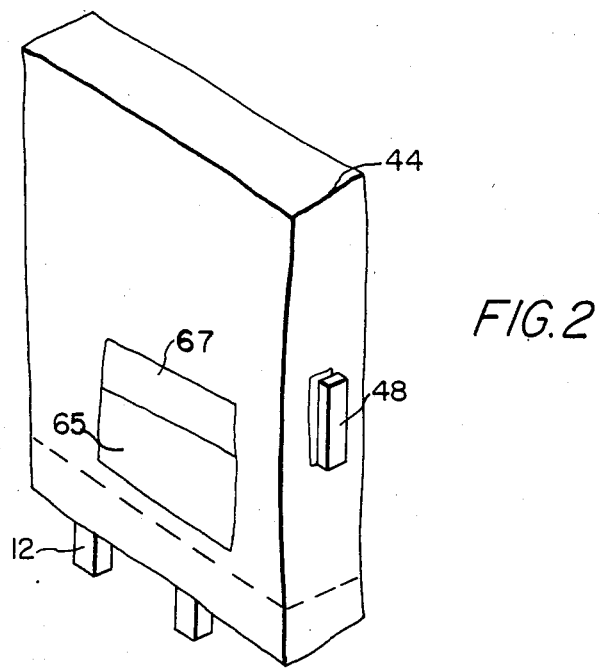
FIG. 2 is a perspective of the disassembled grill with its components nested together for portability.

In FIG. 2, the disassembled grill is shown nested together such that carrying handle 48 may be used for portable carrying and an exterior gadget pouch 65 may be provided with a "Velcro" or like fastening cover 67.

Figure 3:
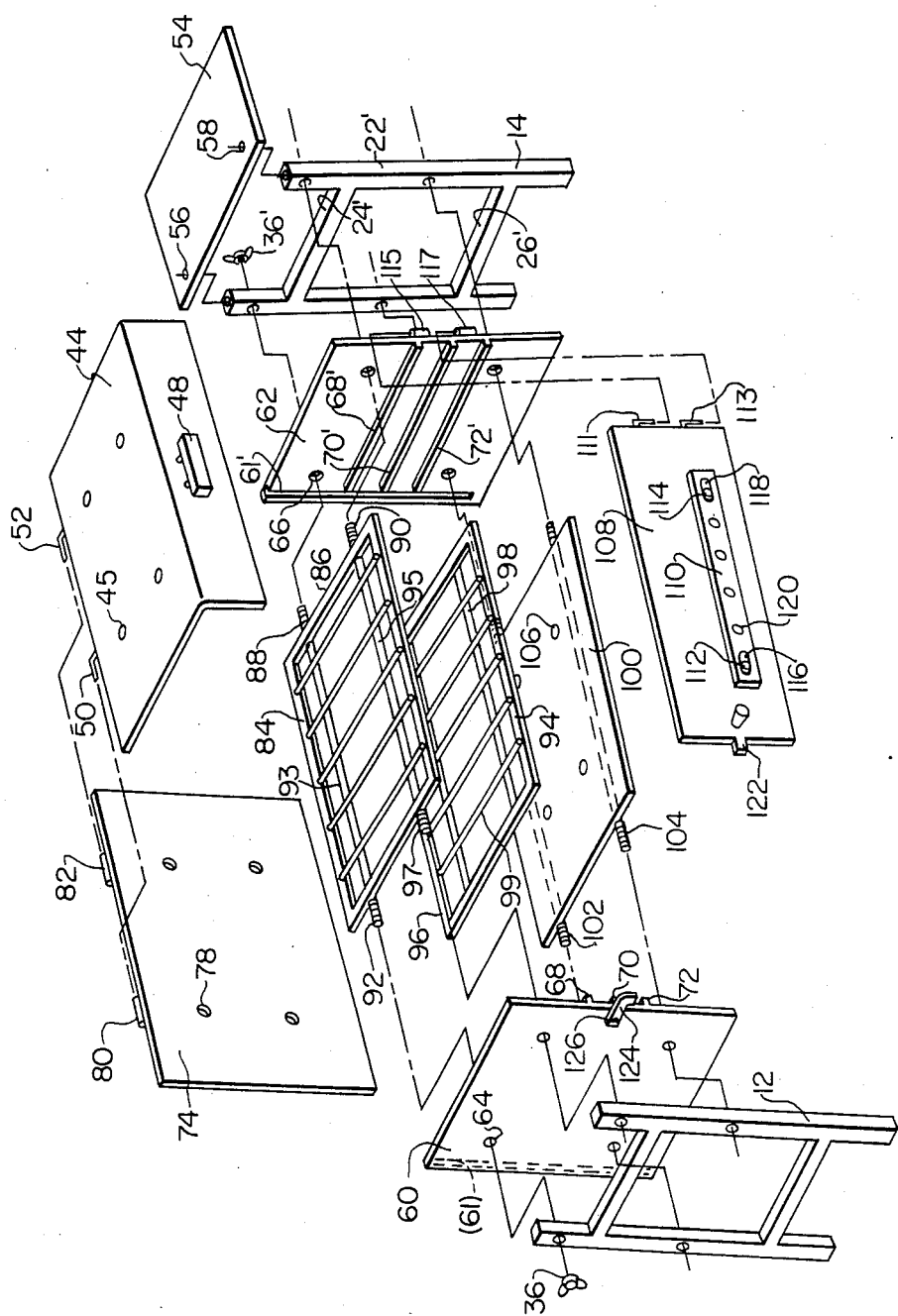
FIG. 3 is an exploded perspective view, showing the portable grill components aligned for assembly.

In FIG. 3, the assembly is illustrated as including cooking grill frame 86 including transverse rods 84 supported upon longitudinally extending rods 93, 95 having respectively threaded ends 88, 92 and 90, 97 extending through left hand end plate 60 and end support 12 for securement by wing nuts 30, 36 and extending through right hand plate 62, apertures 66 and end support 14 for securement by wing nuts 30', 36'. Bottom ash pan 100 may include similar longitudinally extending rods 102, 104 having threaded ends extending through end supports 12 and 14 for securement by means of wing nuts 32, 34.

An intermediate fire grate frame 96 may include transverse rods 99 and longitudinal rods 98. The frame 96 may be supported adjustably upon horizontal beads or shelves 68, 68', 70, 70', 72, 72' secured to end plates 60 and 62.

Back plate 74 having vents 78 may be fitted adjustably within slots 61, 61' defined in the respective end plates 60, 62. Back plate 74 may include cylindrical hinge members 80, 82 for engagement with hinge pins 50, 52 extending rearwardly from the top 44, having vent apertures 45 and carrying handle 48.

Figure 5:
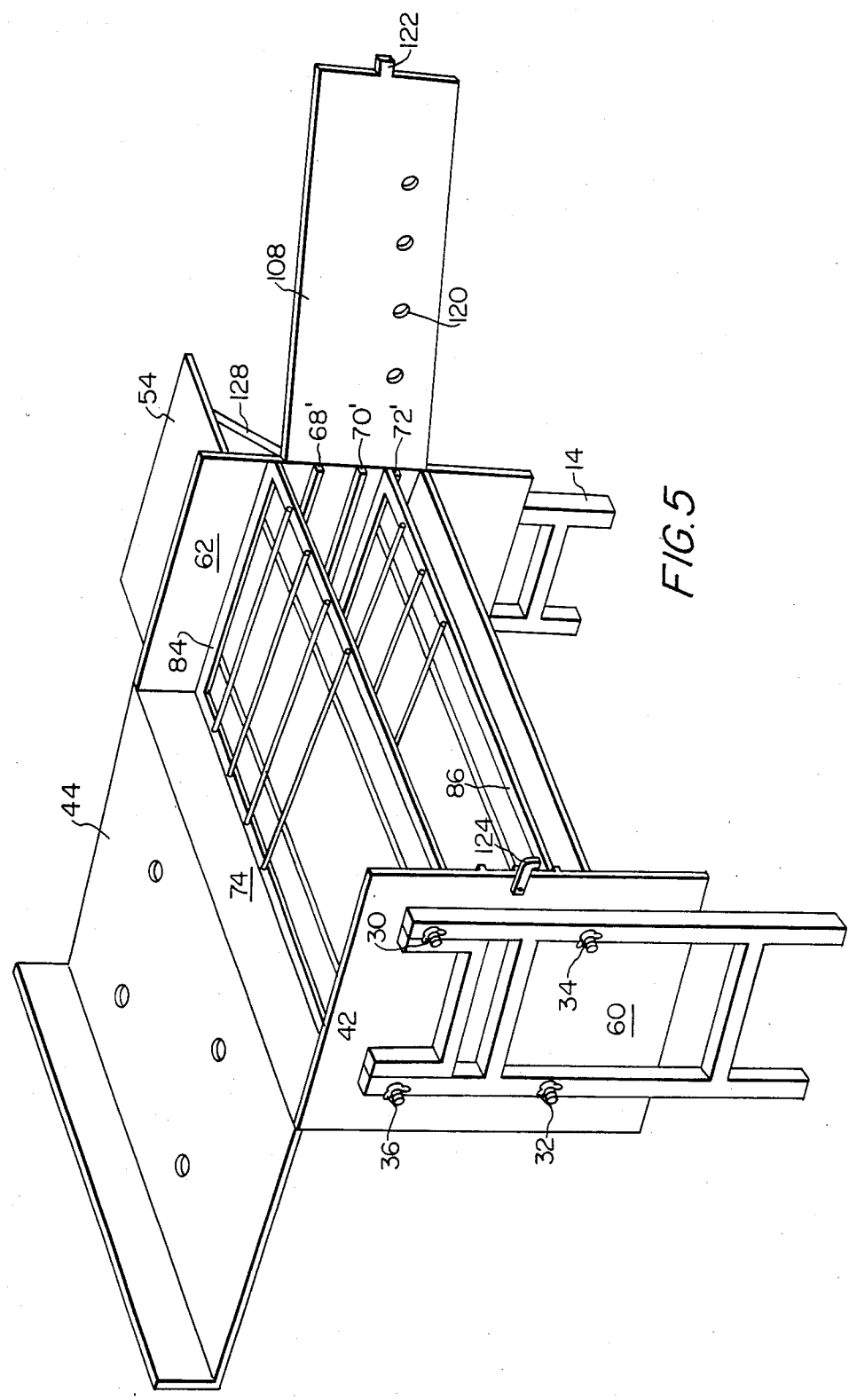
FIG. 5 is a perspective, showing the assembled grill with its top pivoted to open or shelf position and the fire grate door opened.

As will be apparent in FIG. 5, hinged top 44 may be extended outwardly to define a horizontal shelf 44 for support of cooking utensils, food and the like. Also, an optional cooking shelf 54 may be secured to the top of end support 14 by means of vertical pins 56, 58 extending into the top of end support 14. An optional support strut 128 may extend from top lateral member 24' in end support 14.

A fire box door 108, having vent holes 120, aligned with corresponding vent holes defined in sliding vent plate 110 may be provided. Vent plate 110 may have elongated adjusting slots 116, 118 engaging support pins 112, 114, so that the vents 120 may be selectively closed or open. Fire box door hinge pins 111, 113 may engage complementally cylindrical hinge members 115, 117 defined in end plate 62. Also, fire box door 108 may include laterally extending stud 122 engageable with latch 124, pivoted as at 126 to end plate 60.

Figure 4:
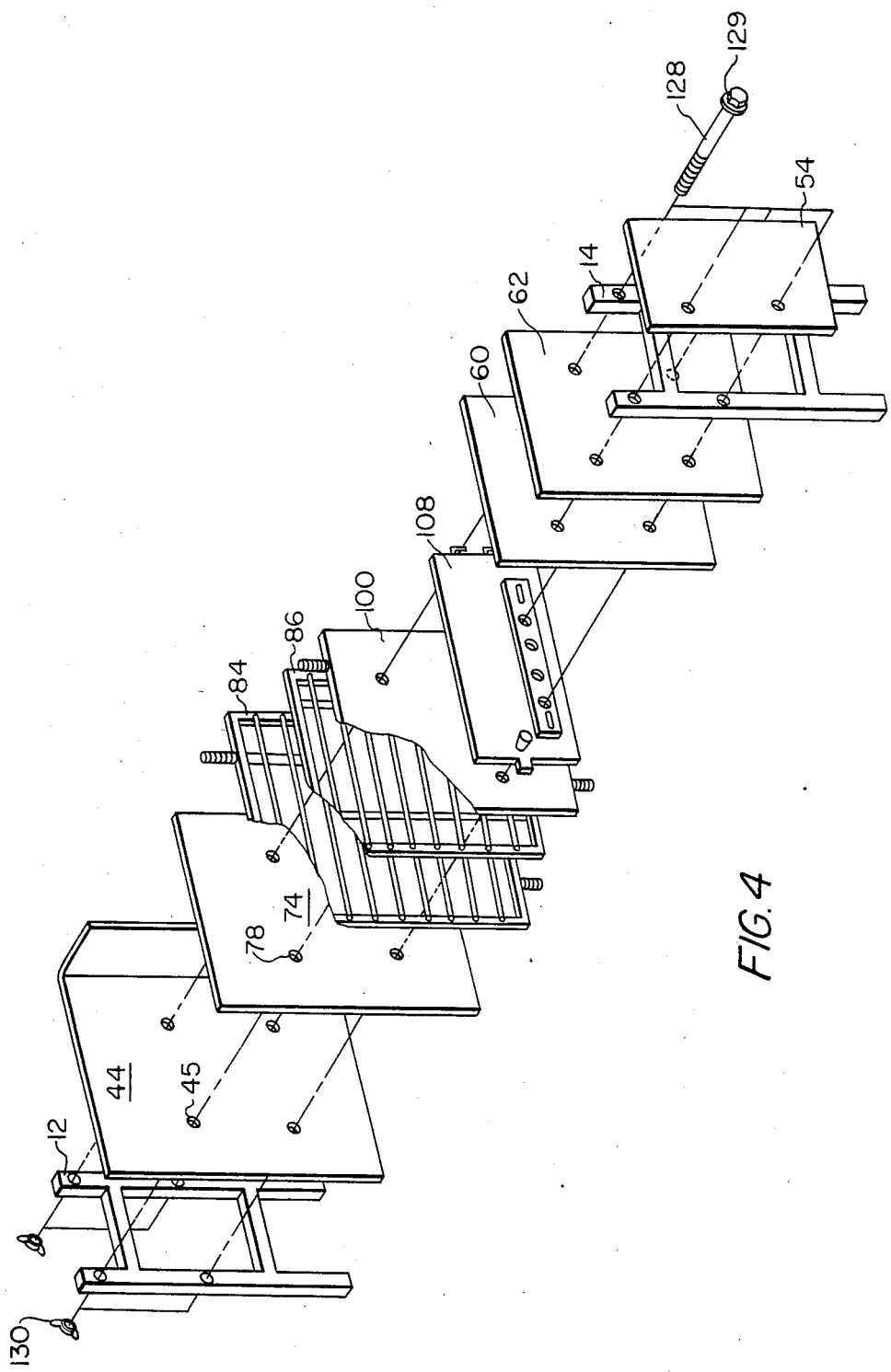
FIG. 4 is a partially fragmentary exploded view, showing the portable grill components aligned for nesting together.

As illustrated in FIG. 4, the entire grill when disassembled may be nested within top 44 and secured intermediate the end supports 12, 14 by means of four threaded bolts 128 having a washer 129 adjacent the bolt head and secured to end support 12 by means of identical wing nuts 130 extending through the apertures defined in the end supports, the end plates 60, 62 ash pan 100, back plate 74 and top 44. The entire assembly may then be carried by means of carrying handle 48 or fitted within a hiker's backpack or the like.

Also, a modification of invention, as illustrated in FIG. 1, includes wheels 16, 18 rotatably mounted upon the lower extremities of end support 14 and a pivoted handle 42 mounted upon end support 12 for moving of the assembled grill about a patio, campfire cooking ground or the like.

Manifestly, the grill may be easily disassembled for portability and may include various modifications to the fire box door, hinged top and shelf without departing from the spirit of the invention.

I claim:

1. A portable cooking grill comprising:
   (a) a pair of upstanding end supports;
   (b) a left upright end plate and a right upright end plate secured to each of said end supports, said end plates in opposed relationship defining a cooking enclosure, each end plate including a plurality of horizontally extending supports defined in its inner face;

(c) a back plate secured at each end to said end plates;

(d) a cooking grill configured so as to complementally engage said opposed end plates, said cooking grill including at least two horizontal rods extending through said end plates and said end supports as a rigidizing support;

(e) a fire grate configured to complementally engage said end plates and being supported at each end upon said horizontally extending supports defined in each of said end plates; and (f) an ash pan configured to complementally engage said opposed end plates, said ash pan including at least two horizontal rods extending through said end plates and said end supports as a rigidizing support.

2. A portable cooking grill as in claim 1, each of said end plates including a vertical groove engageable with the abutting end of said back plate.

3. A portable cooking grill as in claim 1, including a fire box door hinged at one end to one of said end supports, so as to extend across a lower fire box area of said cooking enclosure area intermediate said fire grate and said ash pan.

4. A portable cooking grill as in claim 3, including a top removably hinged to said back plate so as to extend over the cooking area, while being supported at either end upon said end plates.

5. A portable cooking grill as in claim 4, said top including a downwardly extending front panel and a carrying handle mounted upon said front panel.

6. A portable cooking grill as in claim 4, including a horizontal shelf mounted at one end upon one of said end supports so as to extend laterally, outwardly thereof.

7. A portable cooking grill as in claim 3, said fire box door including a slidable vent piece having a plurality of holes registrable with vent holes defined in said fire box door.

8. A portable cooking grill as in claim 4, including an end handle pivoted in the top of one of said end supports.

9. A portable cooking grill as in claim 8, including a pair of wheels mounted upon the bottom of one said end support opposed to said end support in which said end handle is pivoted, so that the cooking grill may be moved in wheelbarrow mode.

10. A portable cooking grill as in claim 7, said fire box door intruding a laterally extending stud and the adjacent end plate including a latch pivotally engageable with said stud as a locking device.

11. A portable cooking grill as in claim 4, said end plates and end supports including horizontally aligned holes, such that said horizontal rods on said cooking grill and ash pan extend therethrough for securement by suitable nut means.

12. A portable cooking grill as in claim 11, said ash pan, back plate and top including a plurality of vent holes.

13. A portable cooking grill as in claim 12, said back plate, cooking grill, fire grate, ash pan and end plates being nestable within said top and secured thereto by threaded bolts extending through the vent holes defined in said ash pan, back plate and top to engage said end support holes for securement.

* * * * *